Feb. 24, 1931.  A. A. SNYDER  1,794,212
FLOWER POT COVER
Filed Jan. 18, 1929
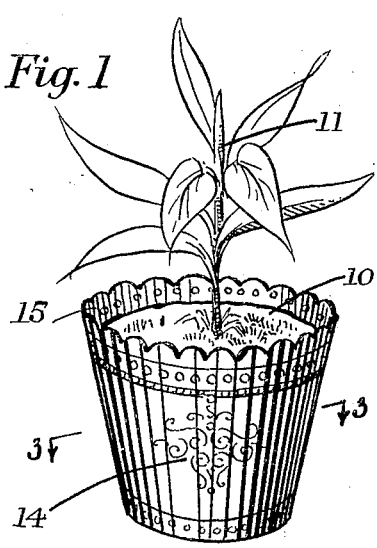
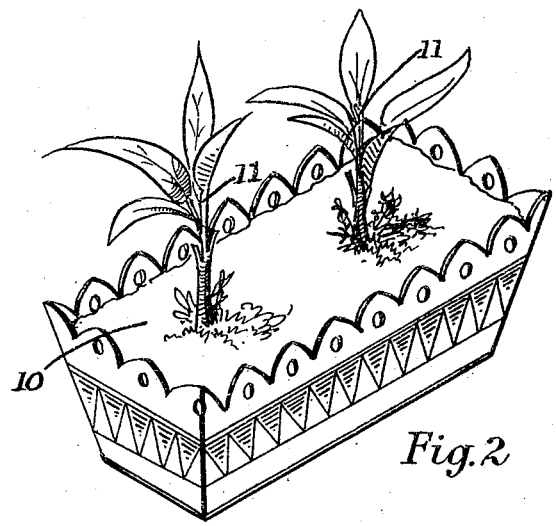
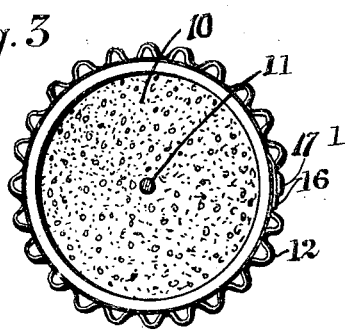
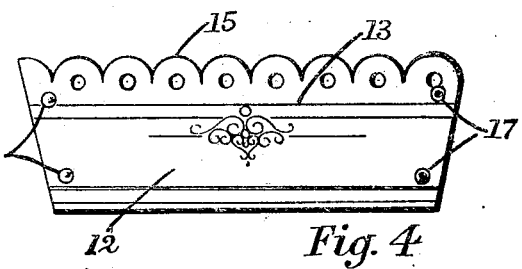
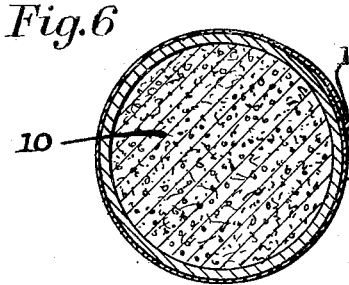
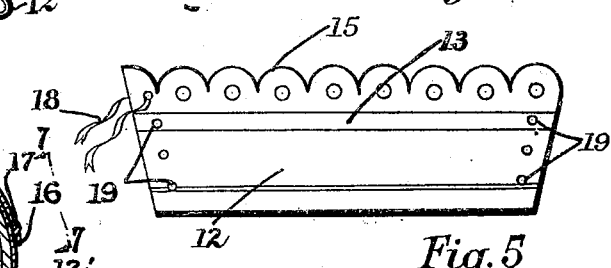
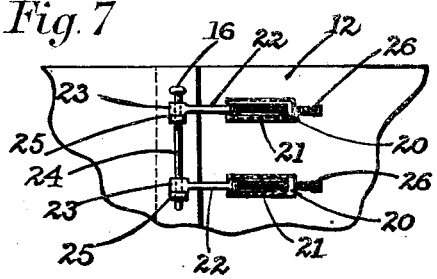
INVENTOR.
Allie A. Snyder
BY
ATTORNEY Patented Feb. 24, 1931

1,794,212

UNITED STATES PATENT OFFICE

ALLIE A. SNYDER, OF NEW YORK, N. Y.

FLOWERPOT COVER

Application filed January 18, 1929. Serial No. 333,478.

This invention relates generally to flower pots, or the like, and has more particular reference to a cover therefor.

The invention has for an object the provision of a flower pot cover of neat appearance and of novel construction, which will efficiently perform its functions, and which can be manufactured and sold at a reasonable cost.

Flower pots are subjected to periodical wettings, due to artificial watering of the contained flowers, and also to natural weather conditions. All of these factors tend to streak and stain the exterior of the flower pots, as well as to deposit a coating of mud thereon. This invention consists in providing a covering of flexible waterproof material shaped to encircle or envelop the flower pot, and having means for removably attaching the same to the flower pot. The exterior of the cover may be ornamentally painted, and the cover itself may be of a waved construction so as to allow passages for water overflowing from the pot, to pass between the covering and the pot, so as not to soil the exterior of the covering. The top edge of the covering is above the top of the flower pot so that overflowing water cannot possibly flow over the front face of the covering.

For further comprehension of the invention and of the objects and advantages thereof, reference will be had to the following description and acompanying drawings, and to the appended claims in which the various novel features of the invention are more particularly set forth.

Referring to the accompanying drawing, forming a material part of this disclosure:—

Fig. 1 is a perspective view of a flower pot provided with a covering constructed according to the invention.

Fig. 2 is a perspective view of a flower box provided with the invention covering.

Fig. 3 is a horizontal sectional view, looking in the direction of the arrows 3—3 of Fig. 1.

Fig. 4 is a developed rear face view of the invention covering.

Fig. 5 is a view similar to Fig. 4, but illustrating a modification of the invention.

Fig. 6 is a view similar to Fig. 3, but illustrating a modification of the invention.

Fig. 7 is a fragmentary face view of the joint ends of the cover, such as seen when looking in the direction of arrow 7—7 of Fig. 6, but illustrating a modification thereof.

The reference numeral 10 indicates generally a flower pot of any shape and construction, such as round, illustrated in Fig. 1, rectangular illustrated in Fig. 2, or the like. Flowers 11 are shown in the flower pots.

A cover 12 of flexible waterproof fabric encircles the pot 10. A reinforcing strap 13 of corrugated form is secured to the inner surface of the cover material 10, so as to give the cover material a wavy shape. The exterior surface of the cover material is ornamented, as indicated by numeral 14. The bottom edge of the cover material is straight, so as to coincide with the bottom edge of the flower pot, the top edge being provided with serrations 15, and the height is such that the lowest portions of the serrations are above the top edge of the flower pot.

The sides of the cover material are joined, as indicated at 16, this being accomplished by snap fasteners 17 as illustrated in Fig. 4 or by a lace 18 laced through apertures 19, illustrated in Fig. 5.

Fig. 6 illustrates a modification in which cover material 12' is smooth, that is, not corrugated.

Fig. 7 illustrates a joint 16' for the side edges of the cover material 12, in which brackets 20 are secured to one of the sides of the material, the brackets being provided with elongated apertures 21. Fingers 22 are slidably engaged in the slots 21, and the free ends of the fingers are provided with apertures 23 through which slide rod 24 passes. This slide rod also passes through eyes 25 secured to the other of the said sides of the material. Screws 26 threadedly engage the brackets 20, and are rotatively attached to the fingers 22. When the cover is engaged on flower pots of different circumferences, screws 26 are turned to move the brackets 20 and attached material end relative to the other end of the material, so as to be properly adjusted thereon.

While I have illustrated and described the preferred form, construction, and arrangement of the several elements employed, it will be understood that the device is nevertheless, susceptible of considerable modification therein, and I therefore reserve the right and privilege of resorting to all such changes as may be fairly embodied within the spirit and scope of the invention as claimed.

Having thus described my invention, what I claim as new and desire to secure by United States Letters Patent is:—

A flower pot cover, comprising a strip of material to encircle a flower pot and having its ends adjacent each other, brackets with apertures secured on one of said ends, fingers with apertures, means for holding said fingers in an indefinite number of various adjusted positions relative to the brackets for adjustments of the encircling size of the cover, and a slide rod removably engaged through the apertures in the brackets and fingers for holding the strip of material encircled around a flower pot and removable to cause the removal of the encircling strip without any alterations to its adjusted size.

In testimony whereof I have affixed my signature.

ALLIE A. SNYDER.